Aug. 13, 1957  C. A. BROWN ET AL  2,802,969
PROTECTIVE SYSTEM FOR DIRECT CURRENT
CIRCUITS AND MACHINES
Filed Sept. 4, 1952  2 Sheets-Sheet 2

Inventors:
Carlyle A. Brown,
Joseph W. Kowalczyk,
by
Their Attorney.

United States Patent Office 2,802,969
Patented Aug. 13, 1957

2,802,969

PROTECTIVE SYSTEM FOR DIRECT CURRENT CIRCUITS AND MACHINES

Carlyle A. Brown and Joseph W. Kowalczyk, Schenectady, N. Y., assignors to General Electric Company, a corporation of New York Application September 4, 1952, Serial No. 307,768

4 Claims. (Cl. 317—13)

This invention relates to protective systems for direct current dynamoelectric machines and circuits, and more particularly to arrangements for protecting such circuits and machines against the effects of ground faults and the like.

The principal object of our invention is to provide a simple and reliable arrangement for detecting faults occurring between selected points in a direct current circuit, which circuit may include a dynamoelectric machine.

A further object is the provision of such a protective system which imposes the minimum burden on the circuit being protected.

A more specific object is the provision of such a protective arrangement which employs the minimum amount of equipment and which utilizes components that are light in weight in order to make the arrangement suitable for use in protecting aircraft generators.

Other objects, features and advantages of our invention will become apparent from the subsequent detailed description of a preferred embodiment thereof, while the scope of the invention is set forth in the appended claims.

In carrying out our invention in one preferred form, we provide a protective arrangement for a direct current generator which comprises a transformer having its primary winding connected in the generator positive lead and a second transformer having the primary winding connected in the negative lead. The secondary windings of the two transformers are connected to a normally balanced electroresponsive device which remains balanced as long as voltage signals from the transformers remain balanced. When a ground fault occurs in the generator, however, these signals are no longer balanced, and this causes the electroresponsive device to operate and disconnect the generator.

For a clearer and more complete understanding of our invention, reference should be had to the accompanying drawing, the two figures of which are electrical circuit diagrams of preferred embodiments of the invention for providing fault protection for generator.

Figure 1:
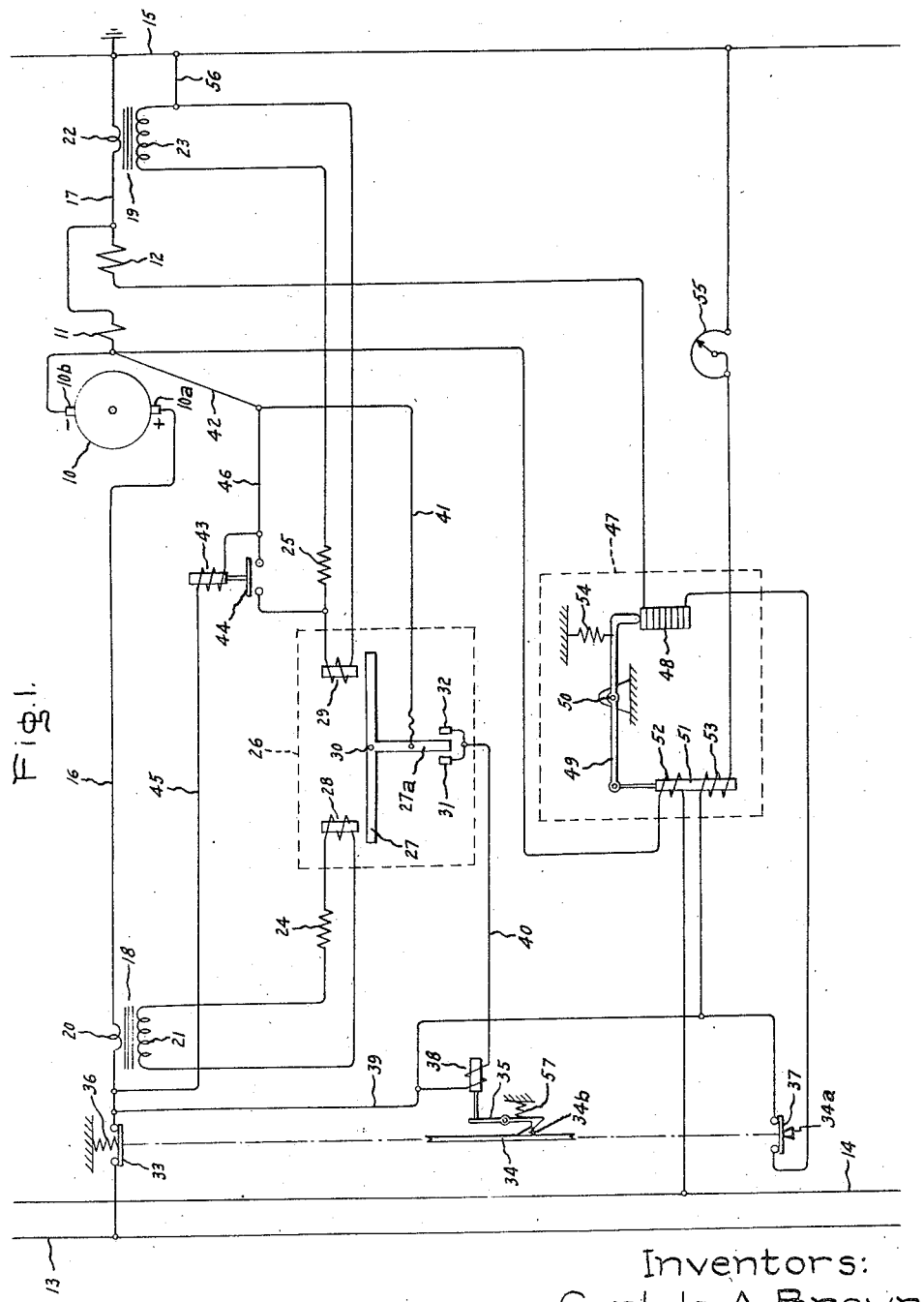

Referring to Fig. 1 of the drawing, there is shown a direct current generator 10 which in a typical case may be a variable speed generator driven by the engine (not shown) of an aircraft and operating at 30 volts. The generator 10 includes a compensating field winding 11 connected in series with the generator armature to carry armature current, and a shunt field winding 12. As shown, the positive terminal 10a of the generator armature is arranged to be connected to a positive load bus 13 by a terminal lead or conductor 16, while the negative terminal 10b of the generator is arranged for connection to a negative load bus 15, shown at ground potential, by a conductor 17. An equalizing bus 14 is also included in the system described herein by way of example, and this bus is discussed in more detail hereinafter.

In a typical case, the generator illustrated may operate in parallel with other generators, which preferably duplicate the present generator, and it will be readily understood by those familiar with electric power systems that such additional generators may readily be connected in parallel with the present generator by connecting them between buses 13 and 15 and to equalizing bus 14 in the same manner as the present generator. Each such additional generator ordinarily should be provided with control and protective equipment duplicating that for generator 10 which is described below.

The control and protective devices and circuits for generator 10, as illustrated in the drawing, include a transformer 18 having a winding 20 connected in the generator positive conductor 16, and a duplicate second transformer 19 having a winding 22 connected in the negative lead 17. Transformers 18 and 19 may be similar to the current transformers commonly used in alternating current circuits, and in a typical case both transformers 18 and 19 have a single turn primary in the usual manner for an alternating current transformer. It is essential that transformers 18 and 19 be of such size and proportions that the magnetizable cores thereof are not saturated by the direct current which flows in conductors 16 and 17 under normal conditions. In a typical case of a 400 ampere generator, for example, the resultant magnetizing force in each transformer amounts to 400 ampere turns, and in such a case the magnetic structure of these transformers each must have sufficient reluctance that 400 ampere turns does not saturate the core. In order to avoid the necessity of using a very large core, we have found it convenient to use a conventional A. C. current transformer and provide an air gap in the magnetic circuit of such transformer. This means for providing the necessary reluctance is particularly advantageous in a case where the protective arrangement is for an aircraft generator as it provides the desired characteristics in a relatively small transformer, and it is very important that the weight of all equipment for use on aircraft be kept to a minimum.

While transformers 18 and 19 are spoken of in the preceding paragraph as having their primary windings 20 and 22 connected in the positive and negative generator terminal conductors, it will be readily understood by those skilled in the art that these so-called connections may be made in many cases merely by threading the conductor through a window in the core of the transformer. This arrangement provides the single turn primary winding shown schematically in the drawing for each transformer.

The secondary winding 21 of transformer 18 and the secondary winding 23 of transformer 19 are connected through resistors 24 and 25 to an electroresponsive relay device 26 which is illustrated schematically in the drawing as comprising a pivoted T-shaped member 27 and a pair of solenoid devices 28 and 29. Member 27 is of magnetizable electrically conductive material and is pivoted about a point 30. The flow of current in solenoid devices 28 and 29 causes these devices to attempt to attract member 27, but as long as equal pull is exerted by both devices member 27 remains stationary. If, however, the pull exerted by devices 28 and 29 becomes unbalanced due to a variation in direction or magnitude of the current in one device from that in the other, the member 27 is pivoted about point 30. This causes the downwardly extending arm 27a of member 27 to engage either a fixed contact 31 on one side of portion 27a or a fixed contact 32 on the other side of 27a. The effect of such operation is explained subsequently.

The control and protective arrangement illustrated in the drawing for generator 10 includes a main switch 33 for connecting the generator to a load and to other generators, if desired, by connecting positive terminal conductor 16 to main bus 13. Switch 33 is closed during normal operation of the generator, and in a typical case may be closed automatically by means (not shown) upon the occurrence of certain favorable conditions in the generator. However, in order to simplify the drawing switch 33 is shown diagrammatically as having an operating rod 34 with a push button 34a for closing switch 33 manually. Switch 33 is held closed in the arrangement illustrated schematically in the drawing by means of a pivoted vertical latch member 35 which engages a projection 34b on rod 34 when switch 33 is closed. When the upper portion of latch member 35 is pivoted to the left through the action of a solenoid 38 overcoming a spring 57, latch 35 is disengaged from projection 34b, and a compression spring 36 causes switch 33 to open. An additional switch 37 having a common operating mechanism with switch 33, as indicated schematically on the drawing, is opened and closed simultaneously with switch 33; the purpose of switch 37 is explained subsequently.

The energizing winding of solenoid 38 which provides the means for pivoting latch 35 to allow switches 33 and 37 to open is connected by a conductor 39 to positive terminal conductor 16 and by another conductor 40 to fixed contacts 31 and 32 in the relay 26. The portion 27a of relay 26 is connected by conductors 41 and 42 to the negative terminal 10b of the generator 10. Consequently, when portion 27a in relay 26 engages either contact 31 or contact 32, a circuit is completed from the generator positive terminal to the generator negative terminal which energizes solenoid 38, opening latch mechanism 34, 35 and allowing switches 33 and 37 to open. The opening of switch 33 disconnects the generator from bus 13, while the opening of switch 37 opens the shunt field circuit for the generator in a manner which is explained in detail subsequently.

Assume now that generator 10 is operating normally, being connected to bus 13 by closed switch 33. If, under these conditions, a fault should occur, such as the grounding of the armature of generator 10, for example, the above described protective arrangement will operate to disconnect the generator from bus 13 and remove excitation from the generator. These control operations which are performed in connection with the generator result from the unbalance occurring in the voltage signals from transformers 18 and 19.

It will be readily understood that no voltage appears across either of the secondary windings 21 and 23 of these transformers as long as a normal steady direct current is flowing through the generator armature and positive and negative leads 16 and 17. The secondary windings of the transformers produce voltage signals only during changes in current in the primary windings, such a change inducing a voltage in the transformer secondary winding. The change in current may be in either sense, the polarity of the resulting voltage signal being determined by whether the current increases or decreases. In the event of a normal change in the generator current, due to a load change, for example, the relay 26 does not operate because the same voltage signal is produced by both transformers. The transformer secondary windings 21 and 23 are connected to produce equal and opposite effects on electroresponsive device 26 in such a case by causing solenoids 28 and 29 to produce equal attractive effects on member 27. Thus member 27 does not move in the event of a normal current change in the generator armature circuit.

However, in the event of a fault between transformers 18 nad 19 such as the grounding of the generator armature, for example, which diverts a part of the current from one of the transformers, the effects of solenoids 28 and 29 on 27 become unbalanced and 27 pivots. In the example which has been chosen of a ground fault in the armature of machine 10 operating as a generator, the voltage signal produced by transformer 18 will be less than that produced by transformer 19 because a portion of the current flowing through the latter transformer will be diverted from the former by the fault. Therefore, solenoid device 29 will attract the right end of the horizontal portion of member 17 and the downwardly extending portion 27a will engage fixed contact 32. The engagement of 27a and 32 completes the circuit previously described for the operation of solenoid 38 which operates latch mechanism 34, 35 and thus opens switches 33 and 37.

The protective arrangement described hereinbefore comprising electroresponsive device 26 and transformers 18 and 19 for deriving signals responsive to current changes in the direct current conductors has been found to provide completely reliable operation for faults occurring in the direct current circuit between the two transformers when the generator 10 is operating normally and supplying power to bus 13. However, in cases when a fault is already in existence before main switch 33 is closed to connect the generator to the remainder of the system, the rate of change of current in conductors 16 and 17 may be so slow that transformers 18 and 19 do not produce enough secondary voltage to operate relay 26, the slower rate of change of current in such a case being due possibly to a simultaneous build-up of voltage and current.

To take care of this contingency, an additional relay device comprising a solenoid 43 operating a switch 44 may be aded to the protective arrangement. Switch 44 is closed when generator 10 is not excited and is producing no armature voltage. The solenoid 43 is connected electrically between the positive and negative generator armature terminals by means of a conductor 45 which is connected to positive lead 16 and a conductor 46 which connects to the conductor 42 and thence to the negative terminal 10b of the generator. When excitation is applied to the generator and as soon as the armature voltage of generator 10 reaches a predetermined value solenoid 43 operates to open switch 44 to the position shown in the drawing.

The effect of relay 43, 44 is to provide a means for unbalancing relay 26 when generator 10 is first energized if there is a fault in generator 10 or in one of conductors 16 and 17 between transformers 18 and 19. When generator 10 is first energized, there is no armature voltage; this is built up gradually over an interval of at least several seconds after the machine is first energized. If, however, a fault is present when excitation is first applied to the generator, there immediately will be a very large current flow through at least a portion of the generator armature circuit including series connected compensating field winding 11. It is this phenomenon which is taken advantage of in the use of relay 43, 44. Since there is no armature voltage when excitation is applied initially, switch 44 is closed, but in the event of a fault there will be a voltage drop produced immediately across compensating field winding 11, by the current therethrough, which will apply a voltage to solenoid 29 and unbalance relay 26 to close contacts 27a, 32 and thereby open switches 33 and 37; a voltage responsive to the voltage drop across compensating field winding 11 appears across winding 29 when switch 44 is closed because of a connection 56 between transformer secondary winding 23 and negative bus 15 to which one side of field winding 11 is connected through the transformer primary winding, the circuit being completed through the winding of solenoid 29, switch 44 and conductors 46 and 42 to the other side of the field winding. It there is no fault and the armature voltage of generator 10 builds up normally, solenoid 43 will open switch 44 when the armature voltage reaches a predetermined value and relay 43, 44 will then be ineffective. Thereafter device 36 will operate in response to signals from transformers 18 and 19 to provide fault protection for the circuit between these two transformers as described hereinbefore.

There is included in Fig. 1 a voltage regulator 47 of conventional arrangement for generator 10. As illustrated, voltage regulator 47 includes a carbon pile 48 which is connected in circuit with shunt field 12 and switch 37 between negative lead 17 and conductor 39 which is connected to the positive lead 16. When switch 37 is closed shunt field 12 is energized to an extent depending upon the resistance of carbon pile 48. The resistance of this carbon pile is varied by regulator 47 to maintain the armature voltage of generator 10 at a selected value.

As shown, voltage regulator 47 includes an arm 49 which is pivoted at 50. The righthand end of arm 49 bears on the carbon pile and varies the resistance of carbon pile 48 by varying the amount of compression exerted on it. An armature 51 is connected to the lefthand end of arm 49 and a pair of windings 52 and 53 are provided for magnetizing armature 51 and thereby exerting a force on it. The forces exerted by windings 52 and 53 are opposed by a compression spring 54, and the joint effect of the magnetic force and the force of spring 54 determines the amount of compressive force exerted on carbon pile 48. Winding 53 of the regulator is connected between conductor 39 and negative bus 15 and, therefore, is directly responsive to the output voltage of generator 10 and exerts a force on arm 49 which is approximately proportional to this output voltage. If, for example, the output voltage of generator 10 should increase for any reason such as a decreased load, winding 53 pulls down on arm 49 with an increased force thereby decreasing the compressive force on carbon pile 48 and increasing the resistance of this carbon pile. This reduces the current flowing through shunt field winding 12 and thereby reduces the output voltage of generator 10 to the selected value. A voltage adjusting rheostat 55 is ordinarily provided in circuit with winding 53 for the adjustment of the terminal voltage of generator 10 which is to be maintained by the regulator. Winding 52 of the regulator is connected in the equalizer circuit, i. e., between equalizer bus 14 and the negative terminal 10b of the generator in the conventional manner to provide for equalization of load among the plurality generators if generator 10 is operated in parallel with one or more additional generators. By means of this well known arrangement, equalizer current, which flows toward the one or more generators which are carrying more than their proportionate share of the load and away from the more lightly loaded generators, is utilized to affect the voltage regulators of the various machines to tend to restore equilibrium. Assuming that generator 10 is carrying more than its proportionate share of the load, for example, current flows from equalizer bus 14 through winding 52 to the negative terminal 10b of the generator and this current increases the downward force exerted on the left end of arm 49 thereby increasing the resistance of carbon pile 48 and decreasing the output voltage of generator 10. Such a decrease in the output voltage of generator 10 causes it to carry a reduced amount of load in order to restore equilibrium.

Figure 2:
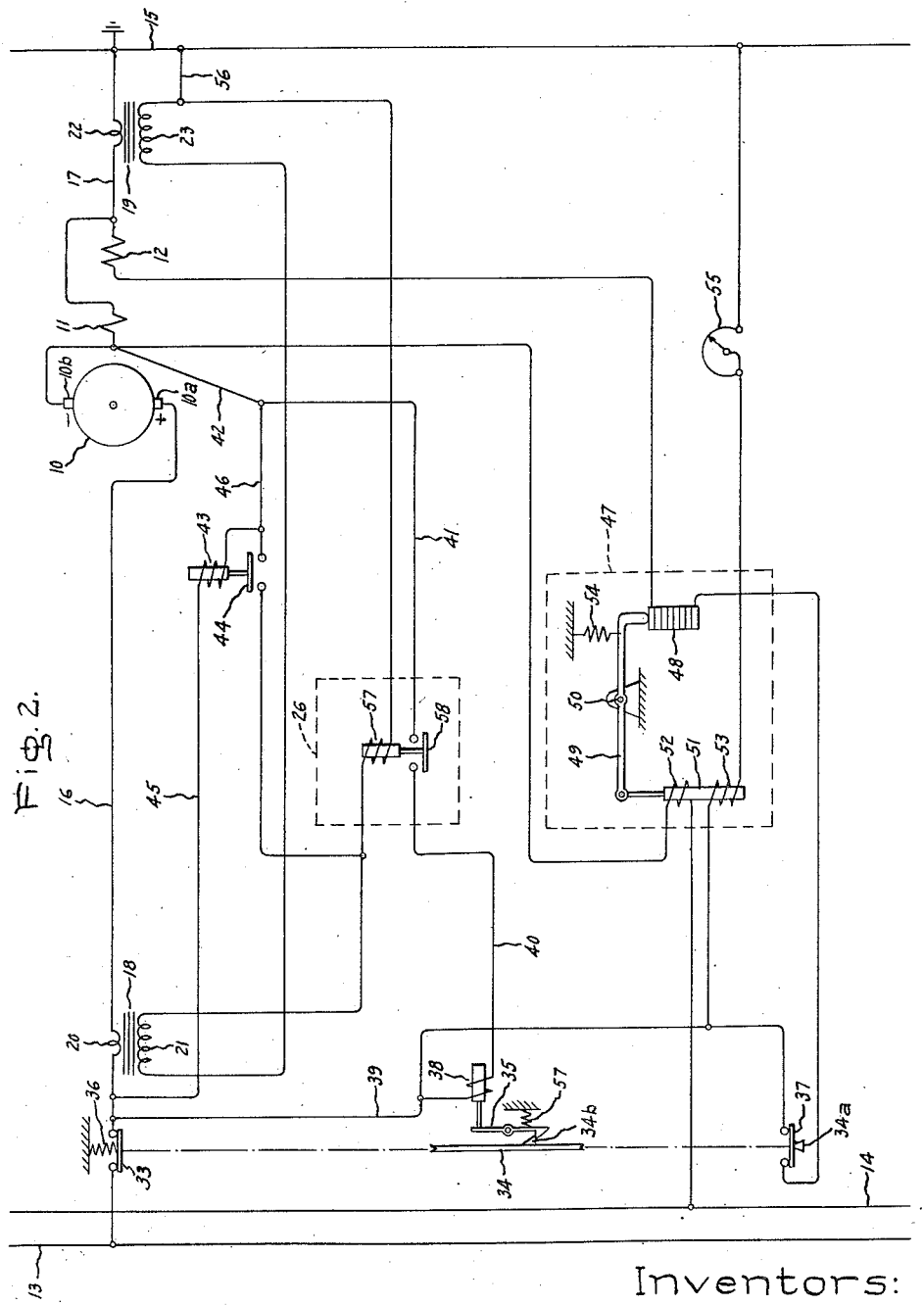

A modified and simplified embodiment of the invention is shown in Fig. 2 of the drawing which is the same as Fig. 1 except for relay 26. In Fig. 2 relay 26 comprises a solenoid 57 which operates to close a switch 58 when a voltage of predetermined magnitude is applied to the coil of solenoid 57. The coil of solenoid 57 is connected in series with transformer secondary windings 21 and 23, while switch 58 is arranged to connect conductors 40 and 41 when it is closed.

Transformer secondary windings 21 and 23 are connected in opposition, so that equal current changes in the primary windings of the two transformers produce equal and opposite secondary voltages, and no current flows through the winding of solenoid 57. If the changes in current in the primary windings of the two transformers are unequal, however, unequal secondary voltages are produced and current circulates through the series circuit in one direction or the other, depending upon which transformer secondary predominates. When this current reaches a predetermined value solenoid 57 operates and closes switch 58. The effect of this is the same as closing switch 27a, 31 or switch 27a, 32 in Fig. 1, i. e. it causes solenoid 38 to operate latch 35 and disconnect the generator from the system. Thus, in Fig. 2 as in Fig. 1, when the current unbalance in the positive and negative generator armature conductors reaches a predetermined amount a control operation is performed in connection with the generator.

It will be readily apparent that the embodiment of the invention shown in Fig. 2 has the advantage of being very simple. It has the further advantage that if there should be a failure of some portion of the protective arrangement, for example, if one of the conductors making up the series loop including the two transformer secondaries and the coil of solenoid 57 becomes broken, the generator will not be disconnected from the system unnecessarily. The generator would no longer have the protection provided against ground faults and the like as provided by the arrangement of this invention, of course, but since no current could flow in the series loop if one of the conductors were open, the solenoid 57 would be unable to operate switch 58 and thereby disconnect the generator from the system unnecessarily.

Another advantage of the arrangement of Fig. 2 is that no current flows in the protective circuit as long as there is no fault. A still further advantage of this arrangement is that the impedances of the two transformers and the conductors connecting their secondaries in the series loop circuit do not have to have their impedances matched accurately.

The embodiment of Fig. 2 is equally adaptable with that of Fig. 1 for use with the arrangement comprising solenoid 43 and switch 44 for operating relay 26 when generator 10 is first energized if there is a fault in the generator or in one of the armature conductors 16 and 17 between transformers 18 and 19, and relays 43, 44 are shown in Fig. 2 in the same manner as in Fig. 1.

In order to simplify the accompanying drawing and the explanation of our invention, we have illustrated and described herein only those elements which are essential to our invention plus certain other elements to facilitate an understanding of the operation of the machine 10 and our invention as used in connection therewith. It will be readily understood, however, by those familiar with control and protective systems for direct current dynamoelectric machines and circuits that our invention can be used in conjunction with other control and protective arrangements which provide overvoltage protection, reverse current protection and the like for the machine or circuit protected by the arrangement of our invention.

It will be readily understood also that this invention is not limited to the specific embodiments described and illustrated herein. It is useful for the protection of any direct current circuit against ground faults and the like whether or not the particular portion of the circuit to be protected includes a dynamoelectric machine or machines and regardless of whether such machines operate as motors, generators or both. As an example, the invention is equally useful in providing protection for a circuit including a motor instead of generator 10. Assuming for the moment that machine 10 is a motor instead of a generator and that a ground fault occurs in the machine during operation, a portion of the current entering from bus 13 will then be diverted in the machine 10 so that the signal provided by transformer 18 will overpower that from transformer 19 and device 26 will be operated to de-energize machine 10 completely in the manner described previously.

It will be apparent from the foregoing that our invention provides a protective arrangement for a direct current circuit which imposes little or no burden on the circuit being protected, depending on whether the arrangement of Fig. 1 or that of Fig. 2 is used and whether or not the feature provided by the relay 43, 44 is employed. At the same time, the invention provides a simple and reliable protective arrangement which employs a small number of components. Moreover, if window type current transformers are employed as discussed hereinbefore, it is not necessary even to break the armature conductors to use this protective arrangement in connection with a dynamoelectric machine.

Modifications other than those discussed hereinbefore may be made by those familiar with protective arrangements of this type. Accordingly, it should be understood that we intend to cover by the appended claims all such modifications which fall within the true spirit and scope of our invention.

What we claim as new and desire to secure by Letters Patent of the United States is:

1. A protective arrangement for a direct current dynamoelectric machine having a winding thereon connected in series with the armature of the machine and provided with a pair of armature terminals, comprising induction means for deriving a first signal responsive to changes in the current flowing through one of the terminals, induction means for deriving a second signal responsive to changes in the current flowing through the other terminal, means responsive jointly to the two said signals for performing a control operation in connection with the dynamoelectric machine when the two signals become unbalanced, means for deriving a third signal responsive to the voltage drop across the series connected winding, and electroresponsive means connected to be responsive to the voltage of said dynamoelectric machine for applying said third signal to said control operation performing means when the armature voltage of said machine is below a predetermined value.

2. A protective arrangement for a direct current dynamoelectric machine having a series connected field winding and provided with positive and negative terminal conductors, comprising transformer means for deriving a first signal voltage responsive to changes in current in the positive conductor, transformer means for deriving a second signal voltage responsive to changes in current in the negative conductor, electroresponsive means responsive jointly to the two said signal voltages for performing a control operation in connection with the dynamoelectric machine when the two signal voltages become unbalanced, means for deriving a third signal voltage responsive to the voltage drop across the series connected field winding, switch means connecting said third signal voltage responsive means to said electroresponsive means, and means responsive to the terminal voltage of the dynamoelectric machine for opening said switch means upon the occurrence of a predetermined terminal voltage.

3. A protective arrangement for a direct current generator having a series connected field winding and provided with positive and negative terminal conductors, comprising a first transformer having one winding connected in circuit with the positive conductor, an additional winding on said first transformer for deriving a first signal voltage responsive to changes in current in the positive conductor, a second substantially duplicate transformer having one winding connected in circuit with the negative terminal conductor, an additional winding on said second transformer for deriving a second signal voltage responsive to changes in the current in the negative conductor, balanced electroresponsive relay means having two oppositely acting windings and responsive jointly to currents in said two windings, means for connecting said additional transformer windings respectively to said two relay windings in a manner that simultaneous voltage signals from the transformers of substantially equal magnitudes and of predetermined polarities maintain the balance of said relay, means for deriving a third signal voltage responsive to the voltage drop across the series connected field winding, switch means for connecting said third signal voltage deriving means to one of said windings, and electroresponsive means responsive to the terminal voltage of the generator for opening said switch means upon the occurrence of a predetermined terminal voltage.

4. A protective arrangement for a direct current generator having a series connected field winding and provided with positive and negative terminal conductors, comprising a first transformer having one winding connected in circuit with the positive conductor, an additional winding on said first transformer for deriving a first signal voltage responsive to changes in current in the positive conductor, a second substantially duplicate transformer having one winding connected in circuit with the negative terminal conductor, an additional winding on said second transformer for deriving a second signal voltage responsive to changes in current in the negative conductor, electroresponsive relay means including an actuating winding and a switch operated thereby, means for connecting said additional transformer windings in a series loop circuit with said actuating winding in a manner such that simultaneous voltage signals from the transformers of substantially equal magnitudes and of predetermined polarities substantially cancel each other and do not operate said switch, means for deriving a third signal voltage responsive to the voltage drop across the series connected field winding, switch means for connecting said third signal voltage deriving means to said actuating winding, and electroresponsive means responsive to the terminal voltage of the generator for opening said switch means upon the occurrence of a predetermined terminal voltage.

References Cited in the file of this patent
UNITED STATES PATENTS

| | | |
|---|---|---|
| 1,184,826 | Cooper | May 30, 1916 |
| 1,761,006 | Butcher | June 3, 1930 |
| 1,819,245 | Jones | Aug. 18, 1931 |
| 2,534,895 | Austin et al. | Dec. 19, 1950 |

FOREIGN PATENTS

| | | |
|---|---|---|
| 562,197 | Germany | Oct. 22, 1932 |
| 805,769 | France | Nov. 28, 1936 |
| 619,015 | Great Britain | Mar. 2, 1949 |

OTHER REFERENCES

"24 Volt Aircraft Electrical System," Westinghouse Engineer, vol. 10, No. 5, pp. 212–216, Sept. 1950.